United States Patent
Masui et al.

(10) Patent No.: US 10,908,484 B2
(45) Date of Patent: Feb. 2, 2021

(54) PROJECTION OPTICAL SYSTEM AND PROJECTOR

(71) Applicant: Konica Minolta, Inc., Tokyo (JP)

(72) Inventors: Atsuo Masui, Sakai (JP); Kazuhiko Inoue, Sakai (JP); Yusuke Imai, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 206 days.

(21) Appl. No.: 16/099,602

(22) PCT Filed: Apr. 20, 2017

(86) PCT No.: PCT/JP2017/015916
§ 371 (c)(1),
(2) Date: Nov. 7, 2018

(87) PCT Pub. No.: WO2017/195561
PCT Pub. Date: Nov. 16, 2017

(65) Prior Publication Data
US 2019/0129285 A1 May 2, 2019

(30) Foreign Application Priority Data
May 9, 2016 (JP) .................................. 2016-093740

(51) Int. Cl.
*G03B 21/14* (2006.01)
*G02B 13/16* (2006.01)
(Continued)

(52) U.S. Cl.
CPC ....... *G03B 21/142* (2013.01); *G02B 13/0095* (2013.01); *G02B 13/04* (2013.01);
(Continued)

(58) Field of Classification Search
CPC .... G02B 15/173; G02B 15/177; G02B 15/14; G02B 13/009; G02B 27/646
(Continued)

(56) References Cited

U.S. PATENT DOCUMENTS

2015/0234167 A1* 8/2015 Ode .................. G02B 15/14
359/432
2015/0293434 A1* 10/2015 Matsuo ................ G02B 17/08
353/101

FOREIGN PATENT DOCUMENTS

CN 101268399 A 9/2008
JP 2006-512595 A 4/2006
(Continued)

OTHER PUBLICATIONS

International Search Report issued in corresponding International Application No. PCT/JP2017/015916 dated Aug. 1, 2017 (5 pages).
(Continued)

*Primary Examiner* — Mohammed A Hasan
(74) *Attorney, Agent, or Firm* — Osha Bergman Watanabe & Burton LLP (57) ABSTRACT

A projection optical system that enlarges an image to be displayed on an image display surface to an angle of view of 70 degrees or more, projects the enlarged image, and includes: a fixed focal length lens that has, in order from an enlargement side, a first optical system and a second optical system on a same optical axis, wherein the second optical system forms an intermediate image of the image, the first optical system enlarges and projects the intermediate image, the projection optical system comprises positive lenses that are positioned on both of the enlargement side and a reduction side of the intermediate image and are adjacent to each other, and following conditional expressions are satisfied: 0.4<Tm1/Tw<0.7 and T12w/Tw<0.2 (2).

16 Claims, 6 Drawing Sheets

(51) Int. Cl.
*G02B 13/00* (2006.01)
*G02B 13/04* (2006.01)
*G02B 13/06* (2006.01)
*G02B 13/22* (2006.01)
*G02B 15/14* (2006.01)
*G03B 21/28* (2006.01)

(52) U.S. Cl.
CPC ............ *G02B 13/06* (2013.01); *G02B 13/16* (2013.01); *G02B 13/22* (2013.01); *G02B 15/14* (2013.01); *G03B 21/28* (2013.01)

(58) Field of Classification Search
USPC .......................................................... 359/808

See application file for complete search history.

(56) References Cited

FOREIGN PATENT DOCUMENTS

| | | |
|---|---|---|
| JP | 2006330410 A | 12/2006 |
| JP | 2008-511020 A | 4/2008 |
| JP | 2015-152890 A | 8/2015 |
| JP | 2016-156983 A | 9/2016 |
| JP | 2017-102239 A | 6/2017 |
| WO | 2004/010199 A2 | 1/2004 |

OTHER PUBLICATIONS

Written Opinion issued in corresponding International Application No. PCT/JP2017/015916 dated Aug. 1, 2017 (16 pages).
Office Action issued in corresponding Chinese Patent Application No. 201780027795.7, dated May 27, 2020, with translation (17 pages).
Extended European Search Report issued in European Application No. 17795922.8; dated Apr. 4, 2019 (8 pages).

* cited by examiner

PROJECTION OPTICAL SYSTEM AND PROJECTOR

TECHNICAL FIELD

The present invention relates to a projection optical system and a projector, and relates to a projection optical system suitable for enlarging and projecting, for example, a display image of an image display element such as a digital micromirror device and a liquid crystal display (LCD) on a screen with a wide angle of view, and a projector including the projection optical system.

BACKGROUND ART

In recent years, there has been a growing demand for a projection optical system with a wide angle of view that enables projection on a large screen even in a narrow space. In order to achieve both a wide angle of view and excellent aberration performance, it is effective to use a relay lens. Thus, projection optical systems using a relay lens for such wide-angle projection have been proposed in Patent Literatures 1 and 2.

CITATION LIST

Patent Literature

Patent Literature 1: JP 2015-152890 A
Patent Literature 2: WO 2004/010199

However, it is difficult to correct off-axis aberrations, particularly distortion even when a relay lens is used. Therefore, it is necessary to increase a lens diameter on the enlargement side or to use a lot of aspheric surfaces, which causes a higher cost. For example, with respect to the zoom lens described in Patent Literature 1, an intermediate image is positioned closer to the enlargement side. As a result, a light beam passing position becomes lower in the vicinity of the intermediate image. Therefore, in order to correct off-axis aberrations, it is necessary to use a lot of aspheric surfaces, which leads to a higher cost. With respect to the zoom lens described in Patent Literature 2, the distance between lenses positioned in front of and behind an intermediate image is too large. As a result, similarly, a light beam passing position becomes lower at either of the lenses positioned in front of and behind the intermediate image. Therefore, it is difficult to sufficiently reduce off-axis aberrations, so that a sufficiently wide angle of view is not achieved.

SUMMARY

The present invention has been made in view of such a situation. One or more embodiments of the present invention provide a high-performance, small-sized, and low-cost projection optical system in which off-axis aberrations are properly corrected while a wide angle of view is achieved, and a projector including the projection optical system.

A projection optical system according to one or more embodiments of the present invention enlarges an image to be displayed on an image display surface to an angle of view of 70 degrees or more, and projects the enlarged image, the projection optical system being a fixed focal length lens or a zoom lens having, in order from an enlargement side, a first optical system and a second optical system on the same optical axis, wherein the second optical system forms an intermediate image of the image, the first optical system enlarges and projects the intermediate image, positive lenses are positioned on each of the enlargement side and a reduction side of the intermediate image so as to be adjacent to each other, in the case of the fixed focal length lens, the following conditional expressions (1) and (2) are satisfied, and in the case of the zoom lens, the following conditional expressions (1) and (2) are satisfied at a wide angle end:

$$0.4 < Tm1/Tw < 0.7 \quad (1)$$

$$T12w/Tw < 0.2 \quad (2)$$

where definitions are provided as follows:

Tm1: an axial distance from a lens surface closest to the enlargement side to a lens surface closest to an intermediate image side, in the first optical system, Tw: an axial distance from the lens surface closest to the enlargement side in the first optical system to a lens surface closest to the reduction side in the second optical system, and T12w: an axial air-gap between the positive lenses positioned on each of the enlargement side and the reduction side of the intermediate image so as to be adjacent to each other.

A projection optical system according to one or more embodiments of the present invention is the above-described projection optical system, wherein the positive lenses positioned on each of the enlargement side and the reduction side of the intermediate image so as to be adjacent to each other are both positive meniscus lenses concave on the intermediate image side.

A projection optical system according to one or more embodiments of the present invention is the above-described projection optical system, wherein in the case of the fixed focal length lens, the following conditional expression (3) is satisfied, and in the case of the zoom lens, the following conditional expression (3) is satisfied at the wide angle end:

$$1 > |\beta 2| > 0.5 \quad (3)$$

where a definition is provided as follows:

β2: paraxial magnification of the second optical system (here, the paraxial magnification is defined as [image size on the image display surface]/[intermediate image size]).

A projection optical system according to one or more embodiments of the present invention is the above-described projection optical system, wherein in the case of the fixed focal length lens, the following conditional expression (3) is satisfied, and in the case of the zoom lens, the following conditional expression (3) is satisfied in the entire variable magnification range:

$$1 > |\beta 2| > 0.5 \quad (3)$$

where a definition is provided as follows:

β2: paraxial magnification of the second optical system (here, the paraxial magnification is defined as [image size on the image display surface]/[intermediate image size]).

A projection optical system according to one or more embodiments of the present invention is the above-described projection optical system, wherein the following conditional expression (4) is satisfied:

$$0.3 < f1/f2 < 3 \quad (4)$$

where definitions are provided as follows:

f1: a focal length of the positive lens positioned adjacent to the intermediate image on the enlargement side thereof, and f2: a focal length of the positive lens positioned adjacent to the intermediate image on the reduction side thereof.

A projection optical system according to one or more embodiments of the present invention is the above-described projection optical system, wherein the second optical system has a negative lens as a lens positioned, in an adjacent manner, on the reduction side of the positive lens closest to the intermediate image side.

A projection optical system according to one or more embodiments of the present invention is the above-described projection optical system, wherein the projection optical system is a zoom lens that changes magnification by moving, along the optical axis, a lens group including at least a part of either the first or second optical system.

A projection optical system according to one or more embodiments of the present invention is the above-described projection optical system, wherein the lens group to be moved for changing magnification is included only in the second optical system.

A projection optical system according to one or more embodiments of the present invention is the above-described projection optical system, wherein the second optical system has a second-a lens group, which is movable at the time of changing magnification and has positive power, at a position closest to the intermediate image side.

A projection optical system according to one or more embodiments of the present invention is the above-described projection optical system, wherein the following conditional expression (5) is satisfied:

$$T2/Tw<0.1 \quad (5)$$

where definitions are provided as follows:

T2: an amount of movement from a position closest to the reduction side to a position closest to the enlargement side in zooming of the second-a lens group, and Tw: the axial distance from the lens surface closest to the enlargement side in the first optical system to the lens surface closest to the reduction side in the second optical system.

A projection optical system according to one or more embodiments of the present invention is the above-described projection optical system, wherein the second optical system has at least one lens group movable at the time of changing magnification, on the reduction side of the second-a lens group.

A projection optical system according to one or more embodiments of the present invention is the above-described projection optical system, wherein the second optical system includes, in order from the enlargement side: the second-a lens group; a second-b lens group which is movable at a time of changing magnification, and has positive power; a second-c lens group which is movable at the time of changing magnification, and has positive power; and a second-d lens group which is fixed at the time of changing magnification, and has positive power.

A projector according to one or more embodiments of the present invention includes: an image display element having the image display surface; and the projection optical system according to the above-described embodiments that enlarges an image to be displayed on the image display surface, and projects the enlarged image on a screen surface.

According to one or more embodiments of the present invention, a configuration of the lenses positioned in front of and behind the intermediate image formed in the second optical system is appropriately set. Therefore, it is possible to properly correct off-axis aberrations including distortion without using a lot of aspheric surfaces even though a wide angle of view is achieved. Accordingly, it is possible to achieve a high-performance, small-sized, and low-cost projection optical system in which off-axis aberrations are properly corrected while a wide angle of view is attained, and a projector including the projection optical system.

DETAILED DESCRIPTION OF EMBODIMENTS

A projection optical system, a projector, and the like according to embodiments of the present invention will be described below. A projection optical system according to one or more embodiments of the present invention enlarges an image to be displayed on an image display surface to an angle of view of 70 degrees or more, and projects the enlarged image. The projection optical system is a fixed focal length lens or a zoom lens having, in order from an enlargement side, a first optical system and a second optical system on the same optical axis. The second optical system forms an intermediate image of the image. The first optical system enlarges and projects the intermediate image. Positive lenses are positioned on each of the enlargement side and the reduction side of the intermediate image so as to be adjacent to each other. Additionally, in the case of the fixed focal length lens, the following conditional expressions (1) and (2) are satisfied, and in the case of the zoom lens, the following conditional expressions (1) and (2) are satisfied at a wide angle end:

$$0.4<Tm1/Tw<0.7 \quad (1)$$

$$T12w/Tw<0.2 \quad (2)$$

where definitions are provided as follows:

Tm1: an axial distance from a lens surface closest to the enlargement side to a lens surface closest to an intermediate image side, in the first optical system, Tw: an axial distance from the lens surface closest to the enlargement side in the first optical system to a lens surface closest to the reduction side in the second optical system, and T12w: an axial air-gap between the positive lenses positioned on each of the enlargement side and the reduction side of the intermediate image so as to be adjacent to each other.

It should be noted that the "enlargement side" refers to a direction of a screen surface (enlargement side image plane) on which an enlarged optical image is projected (so-called front side). The "reduction side" refers to the opposite direction, that is, a direction where an image display element (for example, a digital micromirror device) is disposed (so-called back side). The image display element displays an original optical image on an image display surface (reduction side image plane).

In a wide-angle projection optical system having the second optical system which is a relay lens, the conditional expression (1) defines a position of the positive lens on the enlargement side of the intermediate image, which is one of the positive lenses each positioned in front of and behind the intermediate image in an adjacent manner. When a value exceeds the upper limit of the conditional expression (1), the intermediate image is positioned too close to the reduction side. As a result, the second optical system becomes too small. Therefore, this causes a large aberration (mainly distortion) in the intermediate image, and it becomes difficult to reduce aberrations in an image obtained by enlargement and projection of the intermediate image. When a value is below the lower limit of the conditional expression (1), the positive lens positioned adjacent to the intermediate image on the enlargement side thereof is too close to the enlargement side. As a result, an off-axis light beam passing position becomes lower at the positive lens on the enlargement side of the intermediate image. This also makes it difficult to correct off-axis aberrations (mainly distortion). Therefore, it is possible to effectively reduce off-axis aberrations such as distortion by satisfying the conditional expression (1).

In the wide-angle projection optical system having the second optical system which is the relay lens, the conditional expression (2) defines an axial air-gap between the positive lenses positioned on each of the enlargement side and the reduction side of the intermediate image so as to be adjacent to each other. When a value exceeds the upper limit of the conditional expression (2), the distance between the positive lenses positioned in front of and behind the intermediate image is too large. Therefore, even if the conditional expression (1) is satisfied, the off-axis light beam passing position becomes too low at the lens on the reduction side of the intermediate image. Therefore, it becomes difficult to correct off-axis aberrations (mainly distortion). Accordingly, it is possible to effectively reduce off-axis aberrations such as distortion by satisfying the conditional expression (2).

In a projection optical system having the above-described characteristic configuration, a configuration of the lenses positioned in front of and behind the intermediate image formed in the second optical system is appropriately set. Therefore, it is possible to properly correct off-axis aberrations including distortion without using a lot of aspheric surfaces even though a wide angle of view is achieved. Therefore, it is possible to achieve a high-performance, small-sized, and low-cost projection optical system in which off-axis aberrations are properly corrected while a wide angle of view is attained. In addition, application of the projection optical system to a projector can contribute to, for example, increased performance, increased functionality, and downsizing of the projector. Described below are conditions and the like for achieving higher optical performance, further miniaturization, and the like as well as obtaining the above-described effects in a well-balanced manner.

It is desirable to satisfy the following conditional expression (1a).

$$0.5 < Tm1/Tw < 0.65 \qquad (1a)$$

The conditional expression (1a) defines a further appropriate conditional range based on the above-described viewpoints and the like, in the conditional range defined by the conditional expression (1). Therefore, the conditional expression (1a) is satisfied. Then, the above-described effects can be further enhanced.

It is desirable to satisfy the following conditional expression (2a).

$$T12w/Tw < 0.15 \qquad (2a)$$

The conditional expression (2a) defines a further appropriate conditional range based on the above-described viewpoints and the like, in the conditional range defined by the conditional expression (2). Therefore, the conditional expression (2a) is satisfied. Then, the above-described effects can be further enhanced.

It is desirable that the positive lenses positioned on each of the enlargement side and the reduction side of the intermediate image so as to be adjacent to each other are both positive meniscus lenses concave on the intermediate image side. With this configuration, the lenses positioned in front of and behind the intermediate image form a symmetric system with respect to the intermediate image. Therefore, it is possible to cancel the entire aberrations by generating aberrations in the opposite directions at the lenses in front of and behind the intermediate image. Furthermore, it is possible to particularly reduce distortion that occurs in each lens by forming lenses in a meniscus shape. Thus, off-axis aberration performance can be further improved.

In the case of the fixed focal length lens, it is desirable to satisfy the following conditional expression (3), and in the case of the zoom lens, it is desirable to satisfy the following conditional expression (3) at the wide angle end:

$$1 > |\beta 2| > 0.5 \qquad (3)$$

where a definition is provided as follows:

β2: paraxial magnification of the second optical system (here, the paraxial magnification is defined as [image size on the image display surface]/[intermediate image size]).

The conditional expression (3) defines the paraxial magnification of the second optical system. When a value exceeds the upper limit of the conditional expression (3), an image on the image display surface is reduced in the intermediate image, so that the off-axis light beam passing position in the vicinity of the intermediate image becomes lower. As a result, it tends to be difficult to correct off-axis aberrations. When a value is below the lower limit of the conditional expression (3), the intermediate image becomes too large, and a large aberration also occurs in the intermediate image. Thus, it tends to be difficult to reduce aberrations in a projection image. Therefore, it is desirable that a value falls within the range of the conditional expression (3). As a result of satisfying the conditional expression (3), it is possible to further improve off-axis aberrations at the wide angle end.

In the case of the fixed focal length lens, it is desirable that the conditional expression (3) is satisfied, and in the case of the zoom lens, it is desirable to satisfy the conditional expression (3) in the entire variable magnification range. As a result of satisfying the conditional expression (3) in the entire variable magnification range, it is possible to obtain good off-axis aberrations not only at the wide angle end but also in the entire variable magnification range.

It is desirable to satisfy the following conditional expression (4).

$$0.3 < f1/f2 < 3 \qquad (4)$$

where definitions are provided as follows:

f1: a focal length of the positive lens positioned adjacent to the intermediate image on the enlargement side thereof, and f2: a focal length of the positive lens positioned adjacent to the intermediate image on the reduction side thereof.

The conditional expression (4) defines a ratio of the focal lengths of the lenses positioned in front of and behind the intermediate image. When a value exceeds the upper limit of the conditional expression (4), there is a tendency that the lens on the enlargement side of the intermediate image does not have sufficient power to correct off-axis aberrations having occurred in the lens on the reduction side of the intermediate image. Thus, off-axis aberrations that occur in the lenses positioned in front of and behind the intermediate image are likely to remain uncorrected. The same applies to the case where a value is below the lower limit of the conditional expression (4). In this case, there is a tendency that the lens on the reduction side of the intermediate image cannot correct off-axis aberrations having occurred in the lens on the enlargement side of the intermediate image. Thus, off-axis aberrations are also likely to remain uncorrected in this case. Therefore, it is desirable that a value falls within the range of the conditional expression (4). If a difference between the focal lengths of the lenses positioned in front of and behind the intermediate image is reduced as a result of satisfying the conditional expression (4), it is possible to cancel aberrations in front of and behind the intermediate image and further improve off-axis aberrations.

It is desirable to satisfy the following conditional expression (4a).

$$0.3 < f1/f2 < 2 \tag{4a}$$

The conditional expression (4a) defines a further appropriate conditional range based on the above-described viewpoints and the like, in the conditional range defined by the conditional expression (4). Therefore, the conditional expression (4a) is satisfied. Then, the above-described effects can be further enhanced.

It is desirable that the second optical system has a negative lens as a lens positioned, in an adjacent manner, on the reduction side of the positive lens closest to the intermediate image side. With this configuration, it is possible to further increase the height of the off-axis light beam passing position in the positive lens on the reduction side of the intermediate image. As a result, it is possible to further improve off-axis aberrations.

It is desirable to adopt a zoom lens that changes magnification by moving, along the optical axis, a lens group including at least a part of either the first or second optical system. With this configuration, it is possible to achieve projection on a large screen with favorable performance even when there are restrictions on space and an installation location.

It is desirable that the lens group to be moved for changing magnification is included only in the second optical system. With this configuration, it is possible to fix the first optical system, in which off-axis aberrations are likely to occur, at the time of changing magnification. Thus, it is possible to further reduce occurrence of off-axis aberrations at the time of changing magnification.

It is desirable that the second optical system has a second-a lens group, which is movable at the time of changing magnification and has positive power, at a position closest to the intermediate image side. With this configuration, it is possible to further reduce off-axis aberration variation at the time of changing magnification by moving the second-a lens group at the time of changing magnification while achieving a high light beam passing position in the second-a lens group.

It is desirable to satisfy the following conditional expression (5).

$$T2/Tw < 0.1 \tag{5}$$

where definitions are provided as follows:

T2: an amount of movement from a position closest to the reduction side to a position closest to the enlargement side in zooming of the second-a lens group, and Tw: the axial distance from the lens surface closest to the enlargement side in the first optical system to the lens surface closest to the reduction side in the second optical system.

The conditional expression (5) defines the amount of movement of the second-a lens group. When the conditional expression (5) is satisfied, the amount of movement of the second-a lens group decreases. As a result, it is possible to more effectively reduce off-axis aberration variation at the time of changing magnification while maintaining a high off-axis light beam passing position in the second-a lens group at the time of changing magnification.

It is desirable to satisfy the following conditional expression (5a).

$$T2/Tw < 0.01 \tag{5a}$$

The conditional expression (5a) defines a further appropriate conditional range based on the above-described viewpoints and the like, in the conditional range defined by the conditional expression (5). Therefore, the conditional expression (5a) is satisfied. Then, the above-described effects can be further enhanced.

It is desirable that the second optical system has at least one lens group movable at the time of changing magnification, on the reduction side of the second-a lens group. When magnification is changed with just a single lens group, backfocus variation occurs at the time of changing magnification. However, by adding at least one lens group movable at the time of changing magnification, it is possible to effectively reduce backfocus variation and aberration variation at the time of changing magnification.

It is desirable that the second optical system includes, in order from the enlargement side, the second-a lens group, a second-b lens group which is movable at the time of changing magnification and has positive power, a second-c lens group which is movable at the time of changing magnification and has positive power, and a second-d lens group which is fixed at the time of changing magnification and has positive power. Including three positive-power lens groups that move at the time of changing magnification allows variation in telecentricity to be reduced at the time of changing magnification. In order for a projection optical system with the above-described characteristic configuration to produce an effect, it is necessary to enlarge the intermediate image. Here, it is possible to obtain off-axis light parallel to the optical axis by causing, with the positive-power second-b lens group, an off-axis light beam to make a sharp turn to the opposite side of the optical axis, and by bending the off-axis light beam, which has been caused to make a sharp turn, with the positive-power second-c lens group and second-d lens group. Furthermore, it is possible to further reduce aberration variation at the time of changing magnification by moving the second-b lens group and the second-c lens group at the time of changing magnification.

Figure 1:
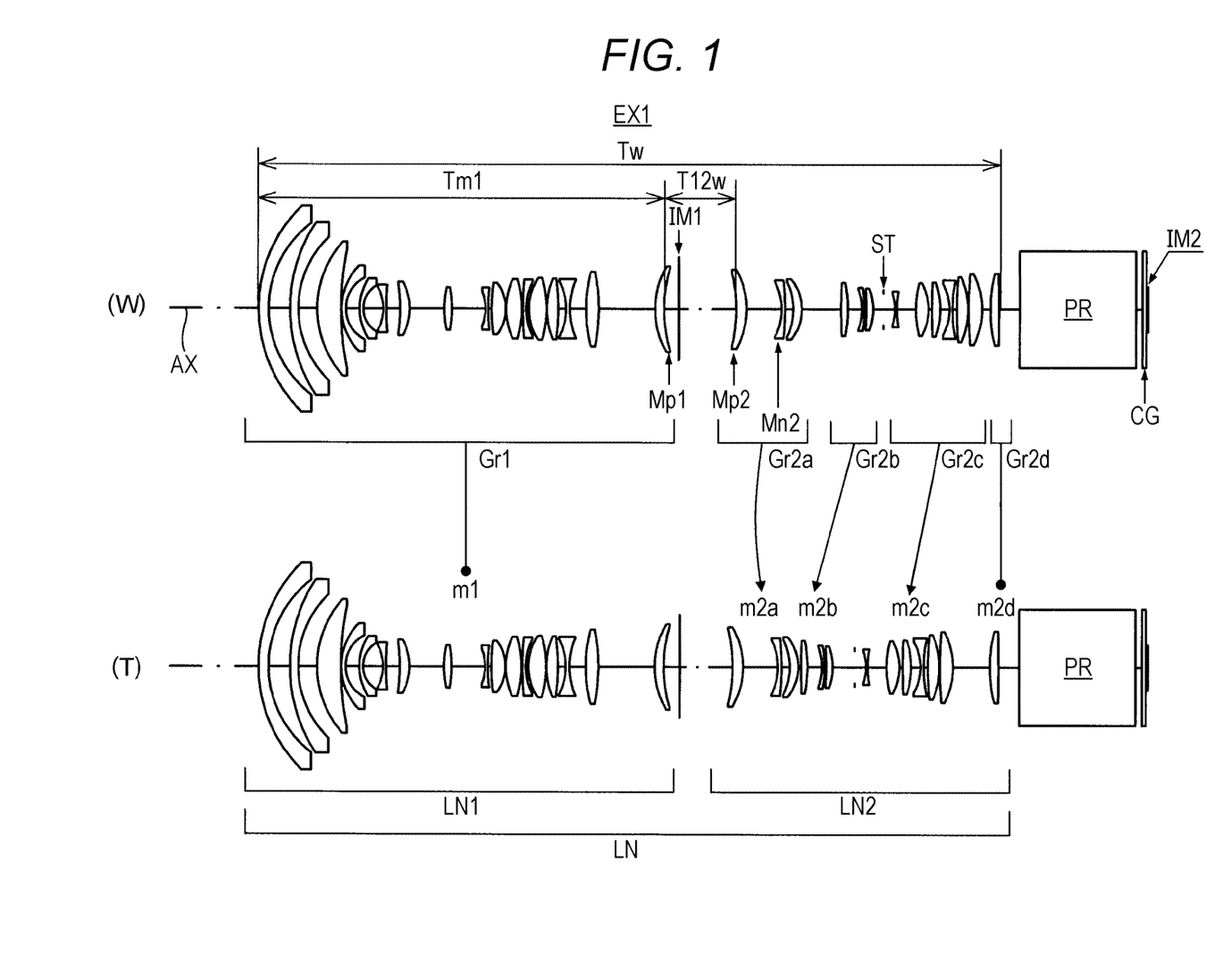
FIG. 1 (Example 1) is an optical configuration diagram of one or more embodiments of the present invention.
Figure 2:
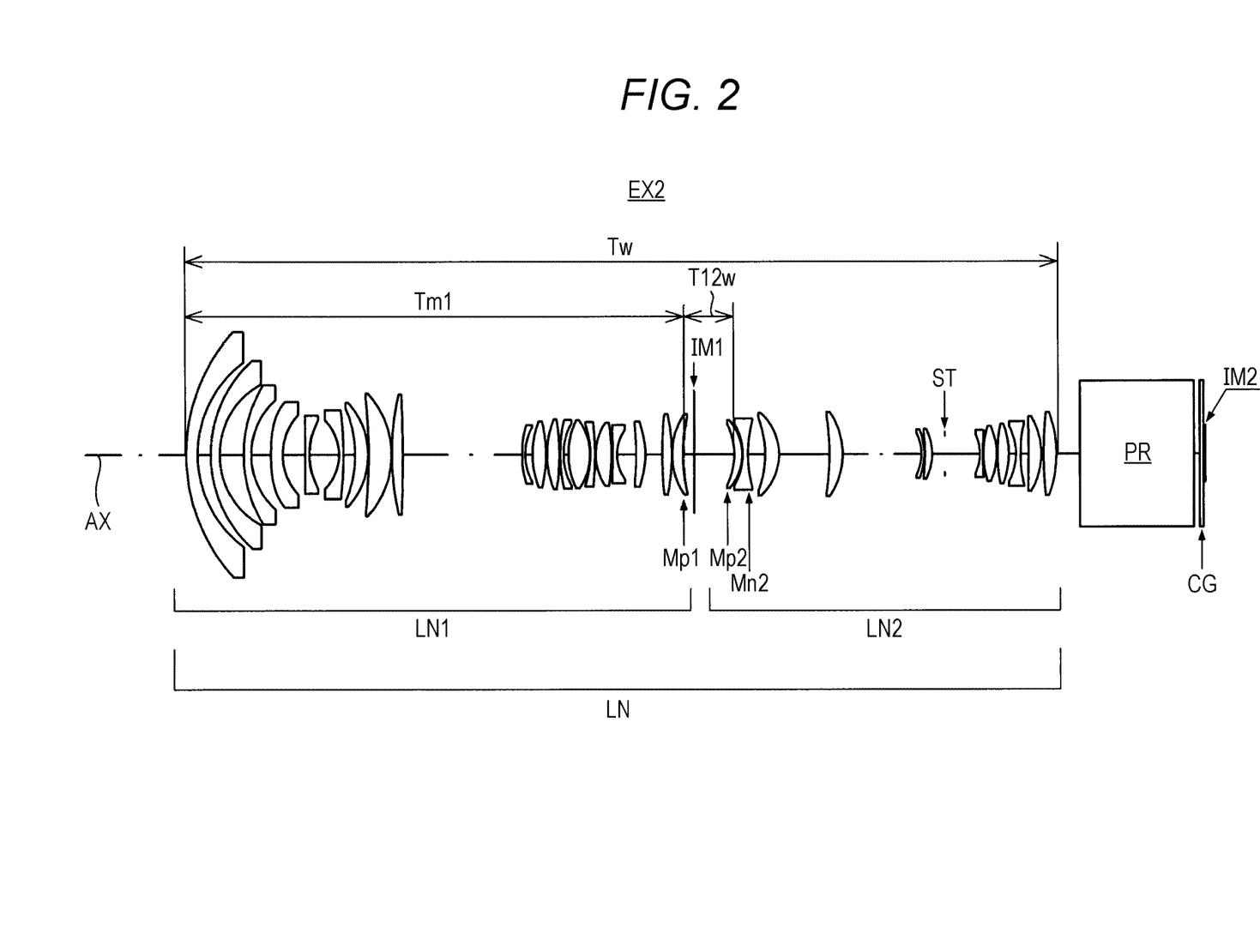
FIG. 2 (Example 2) is an optical configuration diagram of one or more embodiments of the present invention.
Figure 3:
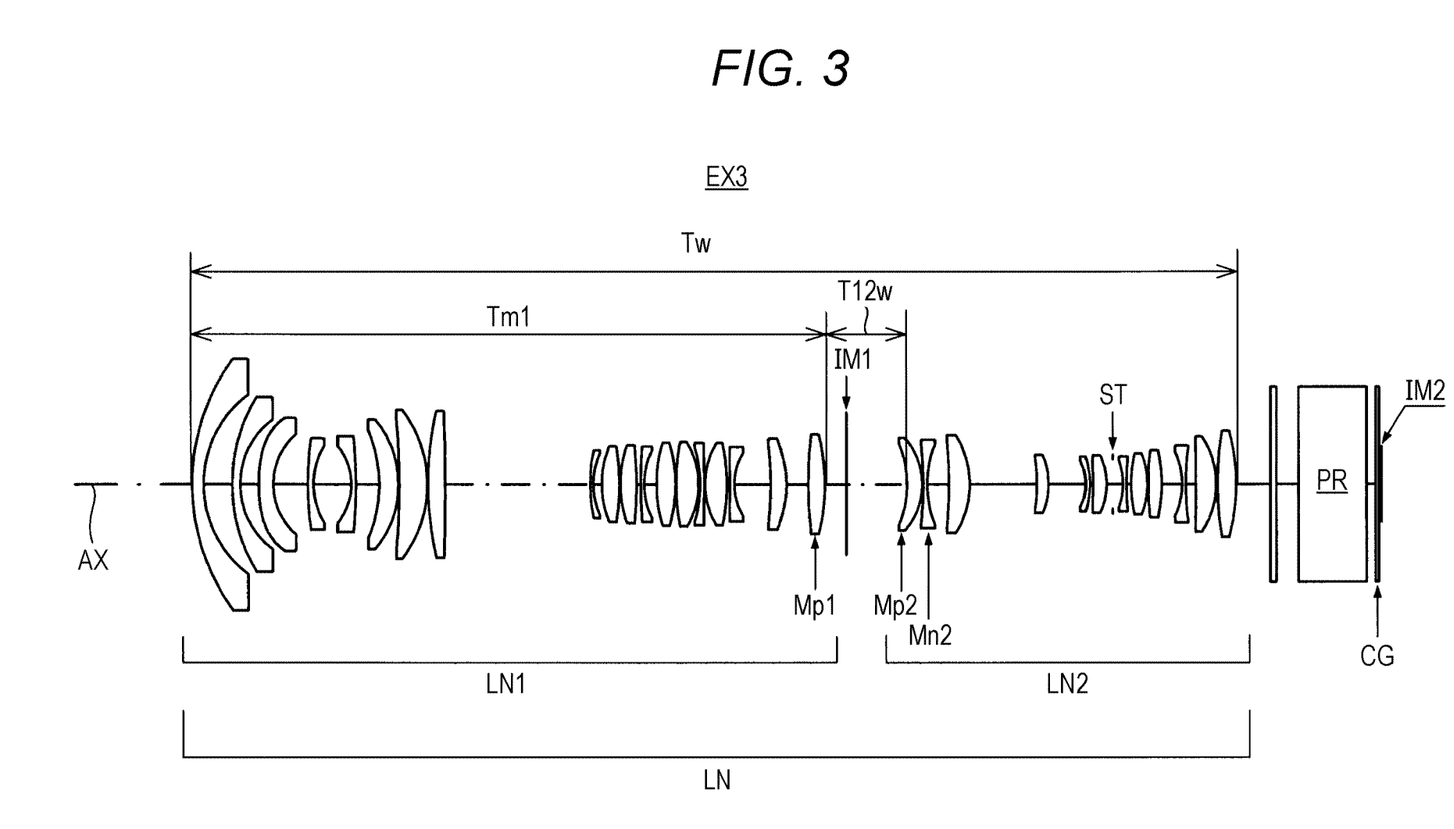
FIG. 3 (Example 3) is an optical configuration diagram of one or more embodiments of the present invention.

Next, an optical configuration of a projection optical system LN according to one or more embodiments will be described. FIG. 1 is an optical configuration diagram of the projection optical system LN according to one or more embodiments. In FIG. 1, cross-sectional shapes of lenses, lens arrangement, and the like of the projection optical system LN as a zoom lens are illustrated as an optical cross section at each of a wide angle end (W) and a telephoto end (T). FIGS. 2 and 3 are optical configuration diagrams of the projection optical systems LN according to one or more embodiments. In FIGS. 2 and 3, cross-sectional shapes of lenses, lens arrangement, and the like of the projection optical systems LN as fixed focal length lenses are illustrated as optical cross sections. It should be noted that a prism PR (for example, a total internal reflection (TIR) prism, a color separation/synthesis prism, or the like) and a cover glass CG of an image display element are positioned on a reduction side of the projection optical system LN.

The projection optical systems LN according to one or more embodiments each include, in order from an enlargement side, a first optical system LN1 (from a first surface to a lens positioned in front of an intermediate image plane IM1) and a second optical system LN2 (from a lens positioned behind the intermediate image plane IM1 to a last lens surface). The second optical system LN2 is configured to form an intermediate image IM1 of an image to be displayed on an image display surface IM2 of the image display element (reduction side image plane). The first optical system LN1 is configured to enlarge and project the intermediate image IM1. It should be noted that an aperture stop ST is located in the vicinity of the center of the second optical system LN2 (for example, in one or more embodiments, closest to the enlargement side in a second-c lens group Gr2c).

FIG. 1 shows a spherical lens system formed of 30 lens components in total, with no aspheric surface. Among the lens components, 17 lens components on the enlargement side constitute the first optical system LN1 for enlarging and projecting the intermediate image IM1, and 13 lens components on the reduction side constitute the second optical system LN2 for forming the intermediate image IM1. The first optical system LN1 is formed of a positive first lens group Gr1 as a whole. The second optical system LN2 includes four positive lens groups (positive, positive, positive, and positive), that is, a second-a lens group Gr2a, a second-b lens group Gr2b, the second-c lens group Gr2c, and a second-d lens group Gr2d, in order from the enlargement side. Magnification is changed only with the second optical system LN2 while the position of the intermediate image IM1 is fixed in zooming (a five-group zoom configuration of positive, positive, positive, positive, and positive).

Arrows m1, m2a, m2b, m2c, and m2d in FIG. 1 schematically indicate movement or fixing of the first lens group Gr1 and the second-a to second-d lens groups Gr2a to Gr2d in zooming from the wide angle end (W) to the telephoto end (T). In other words, the first lens group Gr1 and the second-d lens group Gr2d are fixed groups, and the second-a to second-c lens groups Gr2a to Gr2c are moving groups. The second-a to second-c lens groups Gr2a to Gr2c are each moved along an optical axis AX so as to perform zooming. When magnification is changed from the wide angle end (W) to the telephoto end (T), the second-a lens group Gr2a moves with a locus convex on the enlargement side (U-turn movement), and the second-b lens group Gr2b and the second-c lens group Gr2c each move monotonically to the enlargement side.

As described above, in one or more embodiments, the projection optical system LN moves the moving groups relative to the image display surface IM2 to change intervals between the respective groups on the axis, resulting in magnification being changed from the wide angle end (W) to the telephoto end (T) (that is, zooming). Since zoom positions of the first lens group Gr1 and the second-d lens group Gr2d are fixed, there is no change in the total length of the optical system due to changing magnification, and the number of moving parts is reduced. As a result, a mechanism for changing magnification can be simplified. It should be noted that zoom positions of the prism PR and the cover glass CG positioned on the reduction side of the second-d lens group Gr2d are also fixed.

The intermediate image IM1 formed by the second optical system LN2 is located in the vicinity of the center of the entire projection optical system LN. The intermediate image IM1 is an enlarged image of the image display surface IM2. This makes it possible to achieve a high off-axis light beam passing position in the lens in the vicinity of the intermediate image IM1, and thus achieves high optical performance without using an aspheric surface. On the enlargement side of the intermediate image IM1, there is disposed a positive lens Mp1 having a meniscus shape concave on the intermediate image IM1 side. On the reduction side of the intermediate image IM1, there are disposed, in order from the intermediate image IM1 side, a positive lens Mp2 having a meniscus shape concave on the intermediate image IM1 side, and a negative lens Mn2 having a meniscus shape concave on the intermediate image IM1 side. It is possible to effectively reduce distortion even without aspheric surfaces by appropriately setting a configuration of the lenses positioned in front of and behind the intermediate image IM1 as described above. Therefore, it is possible to achieve a wide-angle projection zoom lens with high performance at low cost.

FIG. 2 shows a spherical lens system formed of 32 lens components in total. Among the lens components, 20 lens components on an enlargement side constitute a first optical system LN1 for enlarging and projecting an intermediate image IM1, and 12 lens components on a reduction side constitute a second optical system LN2 for forming the intermediate image IM1. In the first optical system LN1, an enlargement side surface of a fourth lens from the enlargement side and an intermediate image IM1 side surface of a third lens from the intermediate image IM1 side are aspheric surfaces. Both of the first optical system LN1 and the second optical system LN2 are positive fixed focal length lenses as a whole. A reflecting surface is disposed between an eighteenth surface and a nineteenth surface in the first optical system LN1 so that a projection direction can be changed.

The intermediate image IM1 formed by the second optical system LN2 is located in the vicinity of the center of the entire projection optical system LN. The intermediate image IM1 is an enlarged image of the image display surface IM2. This makes it possible to achieve a high off-axis light beam passing position in the lens in the vicinity of the intermediate image IM1, and thus achieves high optical performance without using a lot of aspheric surfaces. On the enlargement side of the intermediate image IM1, there is disposed a positive lens Mp1 having a meniscus shape concave on the intermediate image IM1 side in an adjacent manner. On the reduction side of the intermediate image IM1, there are disposed, in order from the intermediate image IM1 side, a positive lens Mp2 having a meniscus shape concave on the intermediate image IM side, and a negative lens Mn2 having a biconcave shape. It is possible to effectively reduce distortion by appropriately setting a configuration of the lenses positioned in front of and behind the intermediate image IM1 as described above Therefore, it is possible to achieve a wide-angle projection zoom lens with high performance at low cost.

FIG. 3 shows a spherical lens system formed of 31 lens components in total. Among the lens components, 19 lens components on an enlargement side constitute a first optical system LN1 for enlarging and projecting an intermediate image IM1, and 12 lens components on a reduction side constitute a second optical system LN2 for forming the intermediate image IM1. In the first optical system LN1, an enlargement side surface of a third lens from the enlargement side and an intermediate image IM1 side surface of a second lens from the intermediate image IM1 side are aspheric surfaces. Both of the first optical system LN1 and the second optical system LN2 are positive fixed focal length lenses as a whole. A reflecting surface is disposed between a sixteenth surface and a seventeenth surface in the first optical system LN1 so that a projection direction can be changed.

The intermediate image IM1 formed by the second optical system LN2 is located in the vicinity of the center of the entire projection optical system LN. The intermediate image IM1 is an enlarged image of the image display surface IM2. This makes it possible to achieve a high off-axis light beam passing position in the lens in the vicinity of the intermediate image IM1, and thus achieves high optical performance without using a lot of aspheric surfaces. On the enlargement side of the intermediate image IM1, there is disposed a positive lens Mp1 having a biconvex shape in an adjacent manner. On the reduction side of the intermediate image IM1, there are disposed, in order from the intermediate image IM1 side, a positive lens Mp2 having a meniscus shape concave on the intermediate image IM1 side, and a negative lens Mn2 having a biconcave shape. It is possible to effectively reduce distortion by appropriately setting a configuration of the lenses positioned in front of and behind the intermediate image IM1 as described above Therefore, it is possible to achieve a wide-angle projection zoom lens with high performance at low cost.

There is a tendency that a lens system is long in a type of projection optical system that forms the intermediate image IM1. Thus, in downsizing the entire projection optical system LN, the projection optical system LN is formed as folded optics in an L shape by disposing a reflecting surface with an air gap in the first optical system LN1 as in one or more embodiments. It is possible to reduce the size of a reflecting surface by disposing the reflecting surface in the vicinity of the center of the first optical system LN1. This enables further downsizing.

Figure 7:
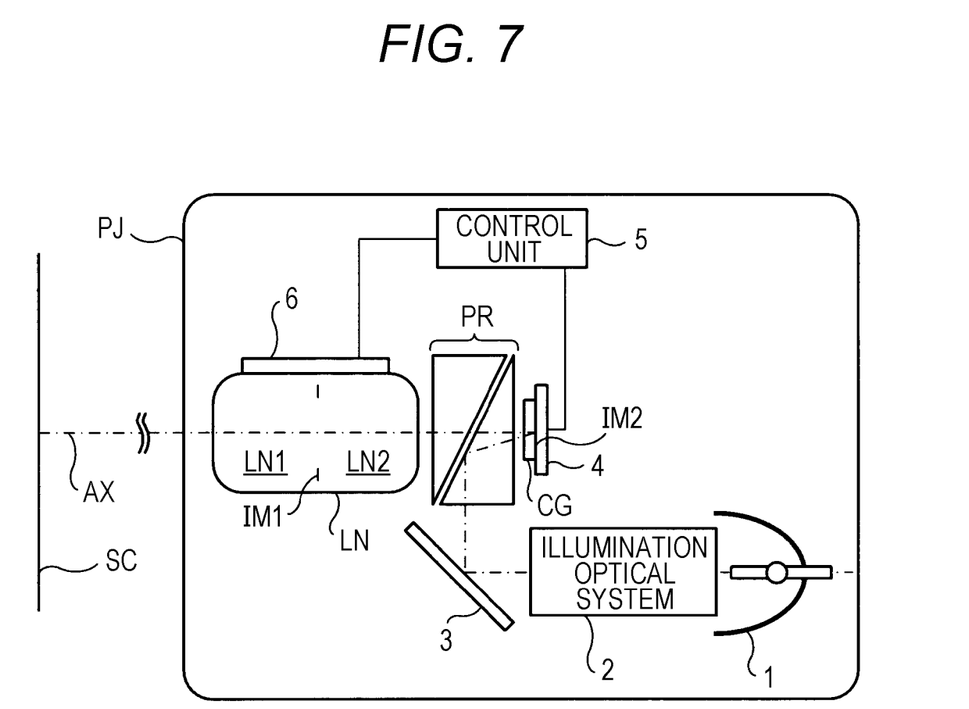
FIG. 7 is a schematic diagram illustrating a projector of one or more embodiments of the present invention.

Next, a projector including the above-described projection optical system LN according to one or more embodiments will be described. FIG. 7 illustrates a schematic configuration example of a projector PJ. The projector PJ includes a light source 1, an illumination optical system 2, a reflecting mirror 3, a prism PR, an image display element (image forming element) 4, a control unit 5, an actuator 6, a projection optical system LN, and the like. The control unit 5 is a section that controls the entire projector PJ. The image display element 4 is an image modulation element (for example, a digital micromirror device) for modulating light to generate an image. The image display element 4 has an image display surface IM2 for displaying an image. The image display surface IM2 has a cover glass CG provided thereon.

Light emitted from the light source 1 (for example, a white light source such as a xenon lamp, and a laser light source) is guided to the image display element 4 via the illumination optical system 2, the reflecting mirror 3, and the prism PR. As a result, image light is formed in the image display element 4. The prism PR includes, for example, a TIR prism (in addition, a color separation/synthesis prism, and the like). For example, the prism PR separates illumination light and projection light. The image light formed in the image display element 4 is enlarged and projected by the projection optical system LN toward a screen surface SC. That is, an image IM2 displayed on the image display element 4 is caused to be an intermediate image IM1 by the second optical system LN2, and then is enlarged and projected on the screen surface SC by the first optical system LN1.

As described above, the projector PJ includes the image display element 4, the light source 1, the illumination optical system 2, and the projection optical system LN. The image display element 4 displays an image. The illumination optical system 2 guides light from the light source 1 to the image display element 4. The projection optical system LN enlarges an image displayed on the image display element 4, and projects the enlarged image on the screen surface SC. However, a projector to which the projection optical system LN can be applied is not limited to the above. For example, if there is used an image display element that displays an image by light emission of the image display surface IM2 itself, it is possible to dispense with illumination. In such a case, a projector can be configured without use of the light source 1 or the illumination optical system 2.

The actuator 6 is connected to each of lens groups that move for zooming and focusing in the projection optical system LN. The actuator 6 moves the lens groups to an enlargement side or a reduction side along an optical axis AX. Furthermore, the control unit 5 is connected to the actuator 6. The control unit 5 controls movement of the moving groups. It should be noted that the lens groups may be manually moved without use of the control unit 5 or the actuator 6.

EXAMPLES

Configurations and the like of projection optical systems according to one or more embodiments of the present invention will be more specifically described below with reference to construction data and the like of examples. Examples 1 to 3 (EX1 to 3) cited here are numerical examples corresponding to the above-described embodiments. The optical configuration diagrams (FIGS. 1 to 3) illustrate cross-sectional shapes of lenses, lens arrangement, and the like of corresponding Examples 1 to 3, respectively.

As surface data, the construction data of each example show, starting from the left column, a surface number i, a paraxial curvature radius r (mm), an axial surface distance d (mm), a refractive index nd with respect to the d line (wavelength of 587.56 nm), and an Abbe number vd with respect to the d line. It should be noted that SC denotes a screen surface, ST denotes an aperture stop, IM1 denotes an intermediate image plane, and IM2 denotes an image display surface.

A surface represented by a surface number i marked with * is an aspheric surface. A surface shape thereof is defined by the following expression (AS) using a local orthogonal coordinate system (x, y, z) with a surface vertex as the origin. Aspheric coefficients and the like are shown as aspheric surface data. It should be noted that in the aspheric surface data of each example, a coefficient of an item with no data entry is zero, and $e\text{-}n = \times 10^{-n}$ for all data:

$$z = (c \cdot h^2)/[1+\sqrt{\{1-(1+K) \cdot c^2 \cdot h^2\}}] + \Sigma(Aj \cdot h^j) \quad (AS)$$

where definitions are provided as follows:

h: a height ($h^2 = x^2 + y^2$) in a direction perpendicular to the z-axis (optical axis AX), z: an amount of sag in a direction of the optical axis AX at a position of the height h (on the basis of the surface vertex), c: a curvature at the surface vertex (a reciprocal of the curvature radius r), K: a conic constant, and Aj: a j-th order aspheric coefficient.

A zoom ratio is shown as various data of Example 1. The various data also include, for each of focal length states W (wide), M (middle), and T (tele), a focal length of the entire system (F1, mm), an F number (Fno.), a half-angle of view (ω, °), an image height (ymax, mm), a total length of a lens (TL, mm), back focus (BF, mm), and a variable surface distance (di, i: surface number, mm). Furthermore, a focal length (mm) of each lens group is shown as zoom lens group data. In addition, various data of Examples 2 and 3 are shown. The various data include a focal length of the entire system (F1, mm), an F number (Fno.), a half-angle of view (ω, °), an image height (ymax, mm), a total length of a lens (TL, mm), and back focus (BF, mm). It should be noted that the back focus BF is a distance from a last lens surface to a paraxial image plane, represented as an air conversion length. The total length of a lens TL is calculated by addition of the back focus BF to a distance from the foremost lens surface to the last lens surface. Moreover, the image height ymax corresponds to half of a diagonal length of the image display surface IM2. It should be noted that TL-BF at the wide angle end (W) corresponds to the axial distance Tw.

Table 1 shows conditional expression corresponding values and related data thereof for each example. Examples of data related to the conditional expressions include a maximum angle of view (2ω, °), a focal length of the first optical system LN1 (fLN1, mm), a focal length of the second optical system LN2 (fLN2, mm), the axial distance from the lens surface closest to the enlargement side to the lens surface closest to the intermediate image IM1 side, in the first optical system (Tm1, mm), the axial distance from the lens surface closest to the enlargement side in the first optical system LN1 to the lens surface closest to the reduction side in the second optical system LN2 (Tw, mm), the axial air-gap between the positive lenses Mp1 and Mp2 positioned on each of the enlargement side and the reduction side of the intermediate image IM1 so as to be adjacent to each other (T12w, mm), the focal lengths of the positive lenses Mp1 and Mp2 (f1 and f2, mm), and the amount of movement from the position closest to the reduction side to the position closest to the enlargement side in the variable magnification range of the second-a lens group Gr2a (T2, mm).

Figures 4A, 4B:
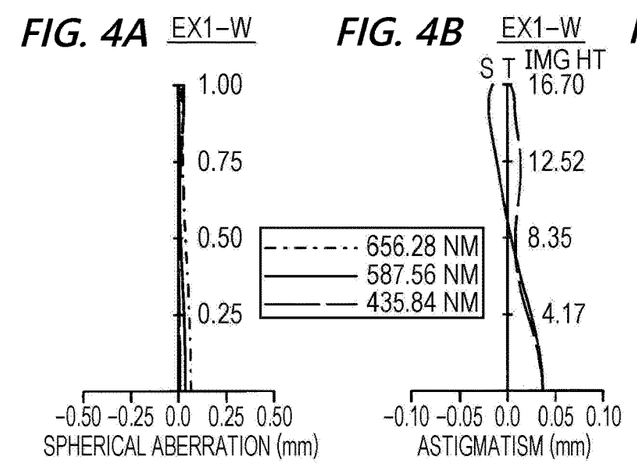
FIGS. 4A-4I are aberration diagrams of Example 1.
Figure 4C:
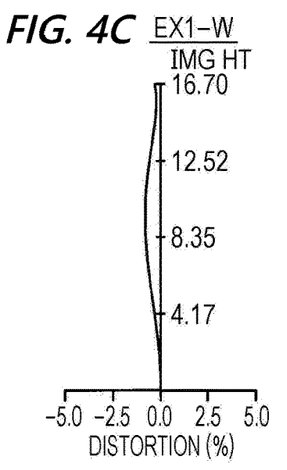
Figures 4D, 4E:
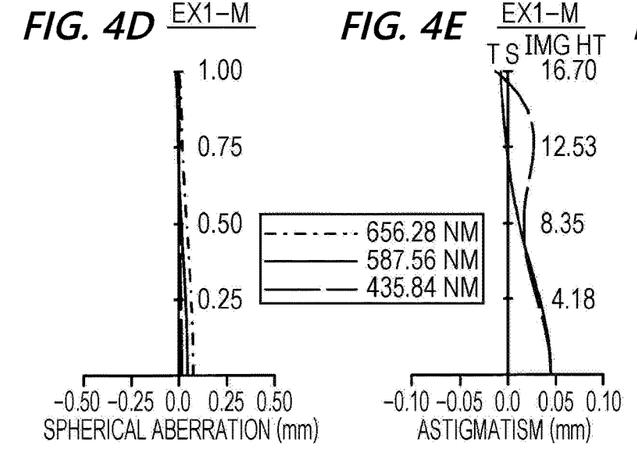
Figure 4F:
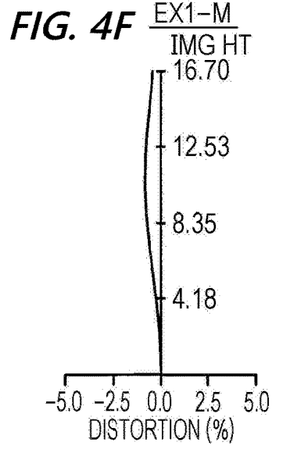
Figures 4G, 4H:
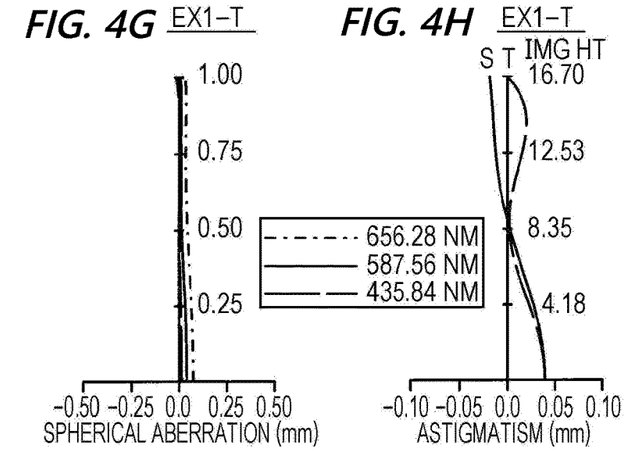
Figure 4I:
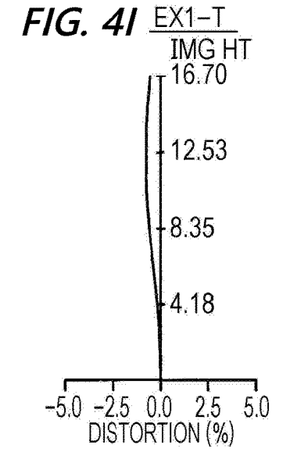
Figures 5A, 5B:
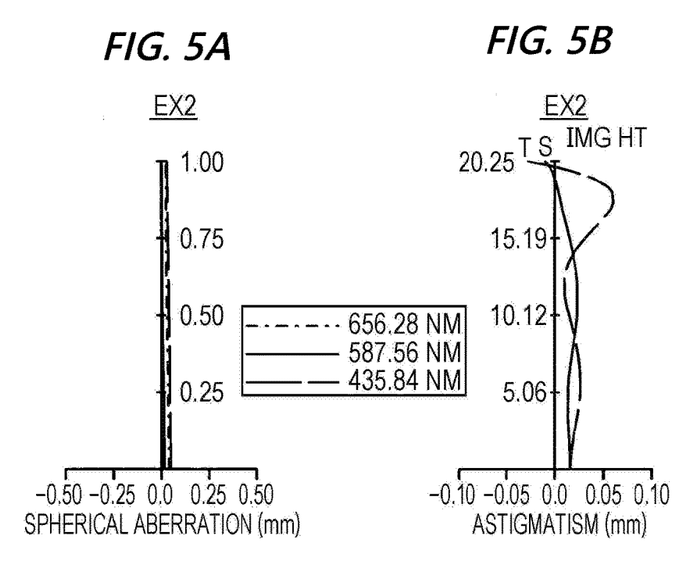
FIGS. 5A-5C are aberration diagrams of Example 2.
Figure 5C:
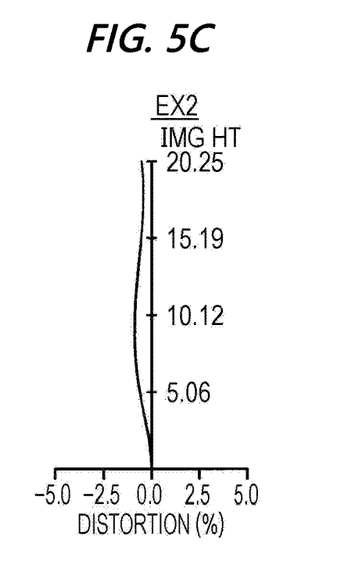
Figures 6A, 6B:
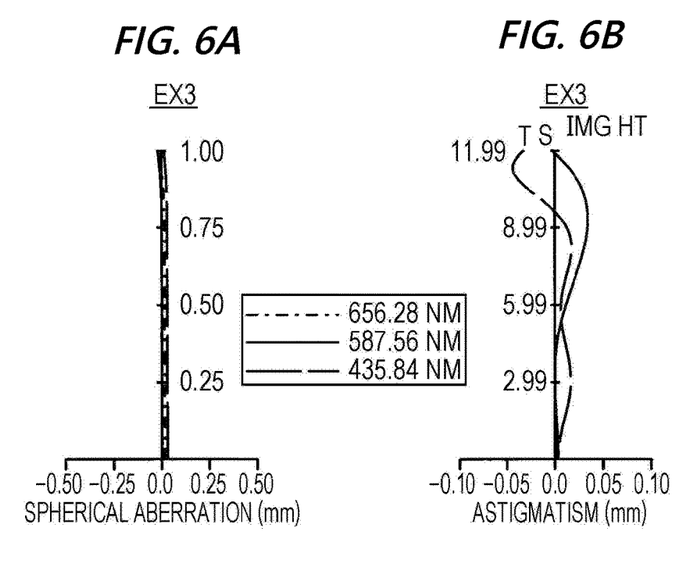
FIGS. 6A-6C are aberration diagrams of Example 3.
Figure 6C:
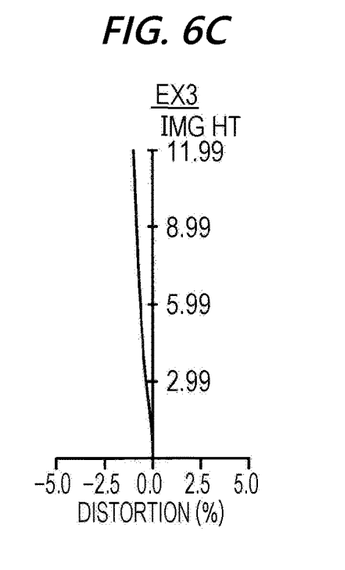

FIGS. 4A-4I are aberration diagrams (longitudinal aberration diagram in an infinity focusing state) corresponding to Example 1 (EX1). FIGS. 4A-4C, 4D-4F, and 4G-4I show various aberrations at the wide angle end W, those in an intermediate focal length state M, and those at the telephoto end T, respectively. Additionally, FIGS. 4A, 4D, and 4G are spherical aberration diagrams, FIGS. 4B, 4E, and 4H are astigmatism diagrams, and FIGS. 4C, 4F, and 4I are distortion diagrams. FIGS. 5A-5C and 6A-6C are aberration diagrams (longitudinal aberration diagrams in the infinity focusing state) corresponding to Examples 2 and 3 (EX2 and 3). FIGS. 5A-5C and 6A-6C include spherical aberration diagrams as (A), astigmatism diagrams as (B), and distortion diagrams as (C).

The spherical aberration diagram shows a spherical aberration amount with respect to the d line (wavelength of 587.56 nm) indicated by a solid line, a spherical aberration amount with respect to the C line (wavelength of 656.28 nm) indicated by an alternate long and short dashed line, and a spherical aberration amount with respect to the g line (wavelength of 435.84 nm) indicated by a broken line. Each of the spherical aberration amounts is represented as a deviation amount (unit: mm) from the paraxial image plane in the direction of the optical axis AX. In the spherical aberration diagram, the vertical axis represents a value of a height of incidence to the pupil normalized with its maximum height (that is, a relative pupil height). In the astigmatism diagram, a broken line T indicates a tangential image plane with respect to the d line, and a solid line S indicates a sagittal image plane with respect to the d line, each of which is represented as a deviation amount (unit: mm) from the paraxial image plane in the direction of the optical axis AX. The vertical axis represents an image height (IMG HT, unit: mm). In the distortion diagram, the horizontal axis represents distortion (unit: %) with respect to the d line, and the vertical axis represents an image height (IMG HT, unit: mm).

It should be noted that in the case where each example is applied, as the projection optical system LN, to a projector (for example, a liquid-crystal projector) PJ (FIG. 7), originally, the screen surface (surface to be projected) SC is an image plane, and the image display surface IM2 (for example, a liquid-crystal panel surface) is an object surface. However, in each example, a reduction system is assumed in terms of optical design, and the screen surface SC is regarded as an object surface (object), so that optical performance is evaluated at the image display surface (reduction side image plane) IM2 corresponding to the image plane (image). Furthermore, as can be understood from the obtained optical performance, the projection optical system LN of each example can be suitably used not only as a projection lens for a projector but also as an imaging lens for an imaging device (for example, a video camera and a digital camera).

Example 1

| Unit: mm | | | | |
|---|---|---|---|---|
| Surface data | | | | |
| i | r | d | nd | vd |
| object(SC) | infinity | 2800.000 | | |
| 1 | 107.629 | 7.400 | 1.69680 | 55.46 |
| 2 | 80.287 | 15.542 | | |
| 3 | 116.752 | 6.100 | 1.80518 | 25.46 |
| 4 | 74.212 | 13.796 | | |
| 5 | 74.044 | 17.700 | 1.83400 | 37.34 |
| 6 | 230.596 | 0.300 | | |
| 7 | 45.596 | 3.100 | 1.80518 | 25.46 |
| 8 | 25.707 | 10.230 | | |
| 9 | 41.726 | 2.641 | 1.90366 | 31.31 |
| 10 | 20.040 | 14.706 | | |
| 11 | −33.017 | 2.200 | 1.77250 | 49.62 |
| 12 | 227.245 | 9.870 | | |
| 13 | −148.578 | 7.217 | 1.80420 | 46.50 |
| 14 | −40.706 | 25.248 | | |
| 15 | 67.692 | 5.586 | 1.75520 | 27.53 |
| 16 | −99.528 | 24.728 | | |
| 17 | −34.147 | 2.000 | 1.90366 | 31.31 |
| 18 | 103.553 | 2.576 | | |
| 19 | 123.303 | 10.351 | 1.43700 | 95.10 |
| 20 | −31.660 | 0.300 | | |
| 21 | 52.497 | 11.574 | 1.43700 | 95.10 |
| 22 | −77.898 | 0.860 | | |
| 23 | 266.100 | 2.273 | 1.90366 | 31.31 |
| 24 | 43.778 | 1.969 | | |
| 25 | 41.219 | 13.469 | 1.43700 | 95.10 |
| 26 | −78.887 | 0.300 | | |
| 27 | 60.094 | 8.235 | 1.49700 | 81.61 |
| 28 | −179.323 | 5.956 | | |
| 29 | −42.514 | 2.700 | 1.60342 | 38.01 |
| 30 | 53.664 | 11.800 | | |
| 31 | 108.515 | 9.547 | 1.80518 | 25.46 |

-continued

Unit: mm

| | | | | |
|---|---|---|---|---|
| 32 | −140.647 | 41.738 | | |
| 33 | 62.172 | 6.599 | 1.80809 | 22.76 |
| 34 | 104.604 | 7.213 | | |
| 35(IM1) | infinity | variable | | |
| 36 | −117.357 | 7.672 | 1.90366 | 31.31 |
| 37 | −59.168 | 26.093 | | |
| 38 | −43.827 | 2.600 | 1.65844 | 50.85 |
| 39 | −216.295 | 5.981 | | |
| 40 | −46.895 | 6.328 | 1.69680 | 55.46 |
| 41 | −35.306 | variable | | |
| 42 | 356.421 | 5.009 | 1.91082 | 35.25 |
| 43 | −97.422 | 10.556 | | |
| 44 | −44.067 | 1.900 | 1.80518 | 25.46 |
| 45 | −84.634 | 1.306 | | |
| 46 | −201.500 | 4.841 | 1.48749 | 70.44 |
| 47 | −43.528 | variable | | |
| 48(ST) | infinity | 8.432 | | |
| 49 | −37.436 | 1.300 | 1.72916 | 54.67 |
| 50 | 69.947 | 14.023 | | |
| 51 | 73.893 | 9.276 | 1.43700 | 95.10 |
| 52 | −41.455 | 2.380 | | |
| 53 | 408.915 | 6.325 | 1.49700 | 81.61 |
| 54 | −61.536 | 6.955 | | |
| 55 | −38.383 | 2.200 | 1.69680 | 55.46 |
| 56 | 103.893 | 3.087 | | |
| 57 | 242.956 | 8.595 | 1.49700 | 81.61 |
| 58 | −59.397 | 0.300 | | |
| 59 | 285.594 | 9.779 | 1.49700 | 81.61 |
| 60 | −58.392 | variable | | |
| 61 | 109.102 | 6.212 | 1.49700 | 81.61 |
| 62 | −1470.164 | 15.300 | | |
| 63 | infinity | 85.000 | 1.51680 | 64.20 |
| 64 | infinity | 5.000 | | |
| 65 | infinity | 3.000 | 1.48749 | 70.44 |
| 66 | infinity | 0.000 | | |
| 67 | infinity | 1.000 | | |
| 68 | infinity | 0.500 | | |
| image(IM2) | infinity | | | |

Various data
zoom ratio 1.31

| | Wide(W) | Middle(M) | Tele(T) |
|---|---|---|---|
| Fl | 13.832 | 15.675 | 18.087 |
| Fno. | 2.444 | 2.500 | 2.573 |
| ω | 50.336 | 46.864 | 42.840 |
| ymax | 16.700 | 16.700 | 16.700 |
| TL | 626.092 | 626.100 | 626.095 |
| BF | 79.892 | 79.900 | 79.895 |
| d35 | 46.316 | 43.771 | 43.987 |
| d41 | 28.940 | 18.091 | 2.000 |
| d47 | 7.759 | 13.015 | 16.043 |
| d60 | 6.212 | 14.351 | 27.197 |

Zoom lens group data

| Group | (Surface i) | Focal length |
|---|---|---|
| Gr1 | (1-35) | 24.897 |
| Gr2a | (36-41) | 296.957 |
| Gr2b | (42-47) | 84.673 |
| Gr2c | (48-60) | 115.132 |
| Gr2d | (61-68) | 204.624 |

Example 2

Unit: mm

Surface data

| i | r | d | nd | vd |
|---|---|---|---|---|
| object(SC) | infinity | 1636.990 | | |
| 1 | 126.773 | 8.600 | 1.70154 | 41.15 |
| 2 | 80.436 | 9.772 | | |
| 3 | 87.744 | 6.667 | 1.83400 | 37.34 |
| 4 | 56.231 | 18.003 | | |
| 5 | 91.681 | 5.712 | 1.91082 | 35.25 |
| 6 | 50.966 | 14.753 | | |
| 7* | 137.901 | 9.007 | 1.80610 | 40.93 |
| 8 | 40.972 | 16.323 | | |
| 9 | 16368.255 | 3.386 | 1.90366 | 31.31 |
| 10 | 51.089 | 21.670 | | |
| 11 | −34.460 | 3.302 | 1.84666 | 23.78 |
| 12 | −256.185 | 8.607 | | |
| 13 | −83.789 | 9.702 | 1.91082 | 35.25 |
| 14 | −54.085 | 0.395 | | |
| 15 | −403.573 | 16.981 | 1.69895 | 30.05 |
| 16 | −63.337 | 0.300 | | |
| 17 | 184.553 | 8.122 | 1.91082 | 35.25 |
| 18 | −975.628 | 88.599 | | |
| 19 | 72.852 | 2.307 | 1.83400 | 37.34 |
| 20 | 38.568 | 5.588 | | |
| 21 | 63.386 | 9.977 | 1.43700 | 95.10 |
| 22 | −95.768 | 0.823 | | |
| 23 | 64.763 | 9.366 | 1.43700 | 95.10 |
| 24 | −145.831 | 0.441 | | |
| 25 | 103.908 | 2.488 | 1.80610 | 40.73 |
| 26 | 43.974 | 3.770 | | |
| 27 | 55.102 | 15.995 | 1.43700 | 95.10 |
| 28 | −41.157 | 0.319 | | |
| 29 | −66.000 | 3.500 | 1.90366 | 31.31 |
| 30 | −217.687 | 0.573 | | |
| 31 | 39.624 | 11.772 | 1.43700 | 95.10 |
| 32 | −128.343 | 0.890 | | |
| 33 | −535.421 | 3.278 | 1.90366 | 31.31 |
| 34 | 29.443 | 14.604 | | |
| 35 | −239.851 | 7.091 | 1.80860 | 40.42 |
| 36* | −45.855 | 12.638 | | |
| 37 | 249.623 | 7.213 | 1.80809 | 22.76 |
| 38 | −136.009 | 0.300 | | |
| 39 | 50.847 | 8.046 | 1.59282 | 68.62 |
| 40 | 127.865 | 8.000 | | |
| 41(IM1) | infinity | 30.048 | | |
| 42 | −47.686 | 5.931 | 1.59270 | 35.45 |
| 43 | −36.057 | 0.481 | | |
| 44 | −42.381 | 3.999 | 1.70154 | 41.15 |
| 45 | 90.657 | 12.716 | | |
| 46 | −72.485 | 10.457 | 1.91082 | 35.25 |
| 47 | −39.244 | 37.864 | | |
| 48 | −183.256 | 9.970 | 1.48749 | 70.44 |
| 49 | −51.461 | 58.594 | | |
| 50 | −31.476 | 2.188 | 1.80518 | 25.46 |
| 51 | −43.961 | 0.497 | | |
| 52 | −155.226 | 5.272 | 1.53775 | 74.70 |
| 53 | −38.438 | 9.438 | | |
| 54(ST) | infinity | 26.240 | | |
| 55 | −30.565 | 2.285 | 1.67270 | 32.17 |
| 56 | 288.795 | 0.350 | | |
| 57 | 62.902 | 9.779 | 1.43700 | 95.10 |
| 58 | −47.195 | 0.724 | | |
| 59 | 113.167 | 8.323 | 1.59522 | 67.73 |
| 60 | −57.715 | 5.329 | | |
| 61 | −40.187 | 3.400 | 1.78590 | 43.93 |
| 62 | 95.416 | 5.957 | | |
| 63 | −1140.356 | 9.434 | 1.53775 | 74.70 |
| 64 | −50.897 | 1.643 | | |
| 65 | 252.051 | 9.639 | 1.80518 | 25.46 |
| 66 | −82.630 | 17.047 | | |
| 67 | infinity | 85.000 | 1.51680 | 64.20 |
| 68 | infinity | 4.000 | | |
| 69 | infinity | 3.000 | 1.48749 | 70.44 |
| 70 | infinity | 1.500 | | |
| image(IM2) | infinity | | | |

Aspheric surface data

| i | K | A4 | A6 | A8 |
|---|---|---|---|---|
| 7 | 2.6571e+000 | 2.9115e−006 | −8.7189−010 | 3.9271e−013 |
| 36 | 0.0000e+000 | 1.0424e−005 | −8.5574e−009 | 5.6578e−012 |

-continued

Unit: mm

Aspheric surface data

| i | A10 | A12 | A14 | A16 |
|---|---|---|---|---|
| 7 | 2.2225e−017 | 0.0000e+000 | 0.0000e+000 | 0.0000e+000 |
| 36 | 4.2587e−016 | −6.1509e−018 | 0.0000e+000 | 0.0000e+000 |

Various data

| | |
|---|---|
| Fl | 7.640 |
| Fno. | 3.016 |
| ω | 70.154 |
| ymax | 20.250 |
| TL | 730.057 |
| BF | 80.619 |

Example 3

Unit: mm

Surface data

| i | r | d | nd | vd |
|---|---|---|---|---|
| object(SC) | infinity | 1663.264 | | |
| 1 | 66.150 | 3.900 | 1.70154 | 41.15 |
| 2 | 35.170 | 9.660 | | |
| 3 | 51.967 | 2.700 | 1.91082 | 35.25 |
| 4 | 25.120 | 6.186 | | |
| 5* | 51.907 | 4.995 | 1.80610 | 40.93 |
| 6 | 20.555 | 11.758 | | |
| 7 | 98.085 | 1.911 | 1.91082 | 35.25 |
| 8 | 22.896 | 12.449 | | |
| 9 | −19.225 | 1.543 | 1.84666 | 23.78 |
| 10 | −169.586 | 7.815 | | |
| 11 | −42.759 | 6.424 | 1.91082 | 35.25 |
| 12 | −31.993 | 0.306 | | |
| 13 | −220.507 | 9.357 | 1.68893 | 31.16 |
| 14 | −38.368 | 0.314 | | |
| 15 | 102.961 | 5.660 | 1.91082 | 35.25 |
| 16 | −868.348 | 48.673 | | |
| 17 | 46.990 | 1.105 | 1.80610 | 40.73 |
| 18 | 23.679 | 2.851 | | |
| 19 | 31.136 | 5.883 | 1.43700 | 95.10 |
| 20 | −72.722 | 0.371 | | |
| 21 | 36.206 | 5.379 | 1.43700 | 95.10 |
| 22 | −129.617 | 1.428 | | |
| 23 | 153.818 | 1.202 | 1.83400 | 37.34 |
| 24 | 23.660 | 4.186 | | |
| 25 | 44.586 | 6.304 | 1.43700 | 95.10 |
| 26 | −47.447 | 0.316 | | |
| 27 | 68.826 | 7.587 | 1.43700 | 95.10 |
| 28 | −25.116 | 0.637 | | |
| 29 | −37.216 | 1.329 | 1.80610 | 40.73 |
| 30 | −436.573 | 0.304 | | |
| 31 | 24.800 | 7.541 | 1.43700 | 95.10 |
| 32 | −59.815 | 0.988 | | |
| 33 | −595.178 | 1.544 | 1.90366 | 31.31 |
| 34 | 18.585 | 12.270 | | |
| 35 | −113.222 | 5.232 | 1.80860 | 40.42 |
| 36* | −26.716 | 7.316 | | |
| 37 | 131.699 | 5.594 | 1.80809 | 22.76 |
| 38 | −64.130 | 8.000 | | |
| 39(IM1) | infinity | 19.818 | | |
| 40 | −32.209 | 5.126 | 1.51680 | 64.20 |
| 41 | −21.987 | 0.300 | | |
| 42 | −123.910 | 1.400 | 1.65844 | 50.85 |
| 43 | 32.557 | 7.348 | | |
| 44 | −149.700 | 7.035 | 1.91082 | 35.25 |
| 45 | −28.873 | 22.495 | | |
| 46 | −52.098 | 3.954 | 1.48749 | 70.44 |
| 47 | −22.931 | 12.425 | | |
| 48 | −16.171 | 1.333 | 1.80518 | 25.46 |

-continued

Unit: mm

| i | r | d | nd | vd |
|---|---|---|---|---|
| 49 | −27.620 | 0.992 | | |
| 50 | −261.933 | 4.657 | 1.53775 | 74.70 |
| 51 | −20.269 | 2.000 | | |
| 52(ST) | infinity | 3.477 | | |
| 53 | −20.575 | 1.153 | 1.67270 | 32.17 |
| 54 | 76.371 | 1.556 | | |
| 55 | 42.084 | 5.467 | 1.43700 | 95.10 |
| 56 | −25.774 | 0.300 | | |
| 57 | 88.941 | 4.475 | 1.59522 | 67.73 |
| 58 | −51.212 | 6.928 | | |
| 59 | −22.525 | 1.237 | 1.74330 | 49.22 |
| 60 | 86.445 | 3.365 | | |
| 61 | −521.950 | 6.792 | 1.53775 | 74.70 |
| 62 | −26.875 | 0.300 | | |
| 63 | 95.796 | 6.249 | 1.80518 | 25.46 |
| 64 | −63.072 | 11.500 | | |
| 65 | infinity | 2.000 | 1.51680 | 64.20 |
| 66 | infinity | 7.500 | | |
| 67 | infinity | 23.000 | 1.51680 | 64.20 |
| 68 | infinity | 3.000 | | |
| 69 | infinity | 1.100 | 1.48749 | 70.44 |
| 70 | infinity | 0.700 | | |
| image(IM2) | infinity | | | |

Aspheric surface data

| i | K | A4 | A6 | A8 |
|---|---|---|---|---|
| 5 | 4.0000e+000 | 1.4190e−005 | −1.3380e−008 | 1.4419e−011 |
| 36 | 0.0000e+000 | 3.6862e−005 | −7.3855e−008 | 1.9915e−010 |

Aspheric surface data

| i | A10 | A12 | A14 | A16 |
|---|---|---|---|---|
| 5 | 1.0192e−014 | 0.0000e+000 | 0.0000e+000 | 0.0000e+000 |
| 36 | −4.0464e−013 | 2.7756e−016 | 0.0000e+000 | 0.0000e+000 |

Various data

| | |
|---|---|
| Fl | 5.671 |
| Fno. | 2.500 |
| ω | 64.899 |
| ymax | 11.982 |
| TL | 391.124 |
| BF | 39.924 |

TABLE 1

| Conditional expression corresponding values and the like | | | Example 1 | Example 2 | Example 3 |
|---|---|---|---|---|---|
| | 2ω | | 100.672 | 140.308 | 129.798 |
| | fLN1 | | 24.897 | 10.446 | 6.894 |
| | fLN2 | W | 117.325 | 77.929 | 60.475 |
| | | M | 132.959 | — | — |
| | | T | 143.632 | — | — |
| (1) | Tm1/Tw | | 0.547 | 0.571 | 0.607 |
| (2) | T12w/Tw | | 0.098 | 0.059 | 0.079 |
| (3) | \|β2\| | W | \|−0.556\| | \|−0.732\| | \|−0.823\| |
| | | M | \|−0.630\| | — | — |
| | | T | \|−0.727\| | — | — |
| (4) | f1/f2 | | 1.427 | 0.654 | 0.472 |
| (5) | T2/Tw | | 0.005 | — | — |
| | Tm1 | | 298.609 | 370.880 | 213.018 |
| | Tw | | 546.200 | 649.438 | 351.200 |
| | T12w | | 53.529 | 38.048 | 27.818 |
| | f1 | | 177.339 | 137.069 | 54.061 |
| | f2 | | 124.277 | 209.681 | 114.493 |
| | T2 | | 2.546 | — | — |

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

LN projection optical system
LN1 first optical system
LN2 second optical system
Gr1 first lens group
Gr2a second-a lens group
Gr2b second-b lens group
Gr2c second-c lens group
Gr2d second-d lens group
ST aperture stop
IM1 intermediate image (intermediate image plane)
IM2 image display surface (reduction side image plane)
Mp1 positive lens
Mp2 positive lens
Mn2 negative lens
PJ projector
PR prism
SC screen surface (enlargement side image plane)
light source
illumination optical system
reflecting mirror
image display element
control unit
actuator
AX optical axis

The invention claimed is:

1. A projection optical system that enlarges an image to be displayed on an image display surface to an angle of view of 70 degrees or more, and projects the enlarged image, the projection optical system comprising:
a fixed focal length lens that has, in order from an enlargement side, a first optical system and a second optical system on a same optical axis, wherein
the second optical system forms an intermediate image of the image,
the first optical system enlarges and projects the intermediate image; and
two positive meniscus lenses that are concave on an intermediate image side and are positioned adjacent to each other on both of the enlargement side and a reduction side of the intermediate image formed between the first optical system and the second optical system, wherein
conditional expressions (1) and (2) below are satisfied:

$$0.4 < Tm1/Tw < 0.7 \qquad (1),$$

$$T12w/Tw < 0.2 \qquad (2),$$

where:
Tm1 is an axial distance from a lens surface closest to the enlargement side to a lens surface closest to the intermediate image side in the first optical system,
Tw is an axial distance from the lens surface closest to the enlargement side in the first optical system to a lens surface closest to the reduction side in the second optical system, and
T12w is an axial air-gap between the positive meniscus lenses positioned on both of the enlargement side and the reduction side of the intermediate image and adjacent to each other.

2. The projection optical system according to claim 1, wherein conditional expression (3) below is satisfied:

$$1 > |\beta 2| > 0.5 \qquad (3),$$

where:
β2 is paraxial magnification of the second optical system, wherein the paraxial magnification is defined as [image size on the image display surface]/[intermediate image size].

3. The projection optical system according to claim 2, wherein conditional expression (4) below is satisfied:

$$0.3 < f1/f2 < 3 \qquad (4),$$

where:
f1 is a focal length of the positive meniscus lens positioned adjacent to the intermediate image on the enlargement side, and
f2 is a focal length of the positive meniscus lens positioned adjacent to the intermediate image on the reduction side.

4. The projection optical system according to claim 1, wherein conditional expression (4) below is satisfied:

$$0.3 < f1/f2 < 3 \qquad (4),$$

where:
f1 is a focal length of the positive meniscus lens positioned adjacent to the intermediate image on the enlargement side, and
f2 is a focal length of the positive meniscus lens positioned adjacent to the intermediate image on the reduction side.

5. The projection optical system according to claim 1, wherein the second optical system comprises a negative lens positioned, in an adjacent manner, on the reduction side of the positive meniscus lens closest to the intermediate image side.

6. A projector comprising:
an image display device having the image display surface; and
the projection optical system according to claim 1, wherein the projection optical system projects the enlarged image on a screen surface.

7. A projection optical system that enlarges an image to be displayed on an image display surface to an angle of view of 70 degrees or more, and projects the enlarged image, the projection optical system comprising:
a zoom lens that has, in order from an enlargement side, a first optical system and a second optical system on a same optical axis, wherein
the second optical system forms an intermediate image of the image,
the first optical system enlarges and projects the intermediate image; and
positive lenses that are positioned on both of the enlargement side and a reduction side of the intermediate image and are adjacent to each other, wherein conditional expressions (1) and (2) below are satisfied at a wide angle end:

$$0.4 < Tm1/Tw < 0.7 \qquad (1),$$

$$T12w/Tw < 0.2 \qquad (2),$$

where
Tm1 is an axial distance from a lens surface closest to the enlargement side to a lens surface closest to an intermediate image side in the first optical system,
Tw is an axial distance from the lens surface closest to the enlargement side in the first optical system to a lens surface closest to the reduction side in the second optical system, and T12w is an axial air-gap between the positive lenses positioned on both of the enlargement side and the reduction side of the intermediate image and adjacent to each other, the zoom lens changes magnification by moving, along the optical axis, a lens group including at least a part of either the first optical system or the second optical system, the second optical system has a second-a lens group at a position closest to the intermediate image side, wherein the second-a lens group is movable at the time of changing magnification and has positive power, and the second optical system includes, in order from the enlargement side: the second-a lens group; a second-b lens group that is movable at a time of changing magnification and has positive power; a second-c lens group that is movable at the time of changing magnification and has positive power; and a second-d lens group that is fixed at the time of changing magnification and has positive power.

8. A projection optical system that enlarges an image to be displayed on an image display surface to an angle of view of 70 degrees or more, and projects the enlarged image, the projection optical system comprising:

a zoom lens that has, in order from an enlargement side, a first optical system and a second optical system on a same optical axis, wherein the second optical system forms an intermediate image of the image, the first optical system enlarges and projects the intermediate image; and two positive meniscus lenses that are concave on an intermediate image side and are positioned adjacent to each other on both of the enlargement side and a reduction side of the intermediate image formed between the first optical system and the second optical system, wherein conditional expressions (1) and (2) below are satisfied at a wide angle end:

$$0.4 < Tm1/Tw < 0.7 \qquad (1),$$

$$T12w/Tw < 0.2 \qquad (2),$$

where

Tm1 is an axial distance from a lens surface closest to the enlargement side to a lens surface closest to the intermediate image side in the first optical system, Tw is an axial distance from the lens surface closest to the enlargement side in the first optical system to a lens surface closest to the reduction side in the second optical system, and T12w is an axial air-gap between the positive meniscus lenses positioned on both of the enlargement side and the reduction side of the intermediate image and adjacent to each other.

9. The projection optical system according to claim 8, wherein the zoom lens changes magnification by moving, along the optical axis, a lens group including at least a part of either the first optical system or the second optical system.

10. The projection optical system according to claim 9, wherein the lens group to be moved for changing magnification is included only in the second optical system.

11. The projection optical system according to claim 9, wherein the second optical system has a second-a lens group at a position closest to the intermediate image side, wherein the second-a lens group is movable at the time of changing magnification and has positive power.

12. The projection optical system according to claim 11, wherein a following conditional expression (5) is satisfied:

$$T2/Tw < 0.1 \qquad (5),$$

where definitions are provided as follows:

T2: an amount of movement from a position closest to the reduction side to a position closest to the enlargement side in zooming of the second-a lens group, and Tw: the axial distance from the lens surface closest to the enlargement side in the first optical system to the lens surface closest to the reduction side in the second optical system.

13. The projection optical system according to claim 11, wherein the second optical system has at least one lens group movable at the time of changing magnification, on the reduction side of the second-a lens group.

14. The projection optical system according to claim 8, wherein the zoom lens changes magnification by moving, along the optical axis, a lens group including at least a part of either the first optical system or the second optical system.

15. The projection optical system according to claim 8, wherein conditional expression (3) below is satisfied at the wide angle end:

$$1 > |\beta 2| > 0.5 \qquad (3),$$

where $\beta 2$ is paraxial magnification of the second optical system, wherein the paraxial magnification is defined as [image size on the image display surface]/[intermediate image size].

16. The projection optical system according to claim 13, wherein conditional expression (3) below is satisfied in an entire variable magnification range:

$$1 > |\beta 2| > 0.5 \qquad (3),$$

where $\beta 2$ is paraxial magnification of the second optical system, wherein the paraxial magnification is defined as [image size on the image display surface]/[intermediate image size].

* * * * *